Aug. 8, 1950  R. S. LEIGH  2,518,239
SPRAY NOZZLE MOUNTING AND OSCILLATING MECHANISM
Filed Jan. 3, 1945  3 Sheets-Sheet 1

INVENTOR
Richard S. Leigh
BY
*[signature]*
ATTORNEY

Aug. 8, 1950 R. S. LEIGH 2,518,239
SPRAY NOZZLE MOUNTING AND OSCILLATING MECHANISM
Filed Jan. 3, 1945 3 Sheets-Sheet 2
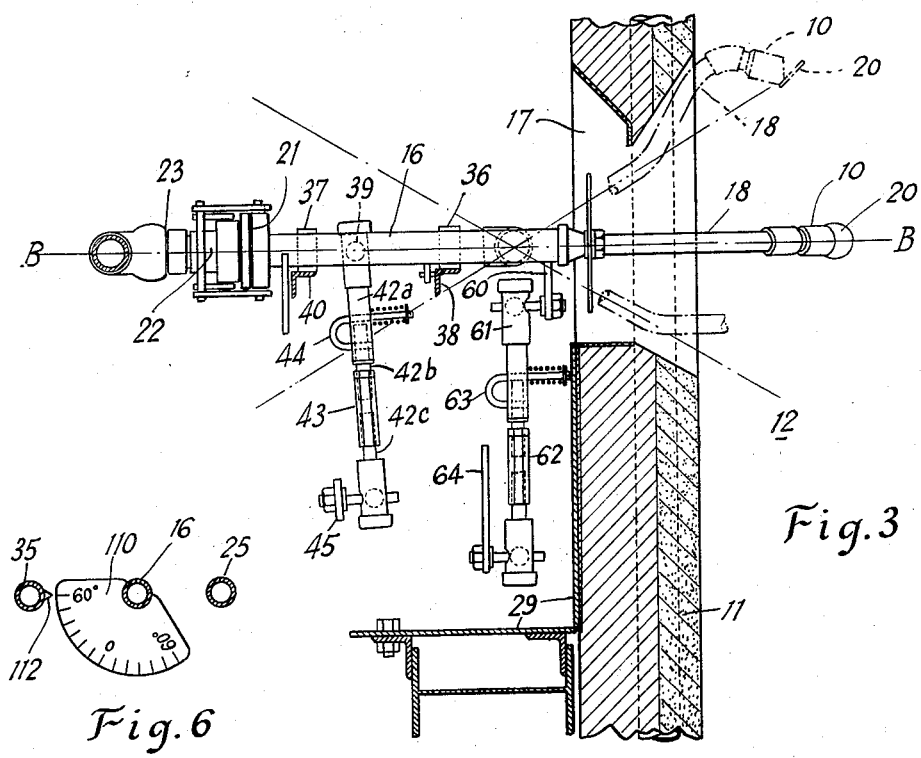
Fig.3
Fig.6
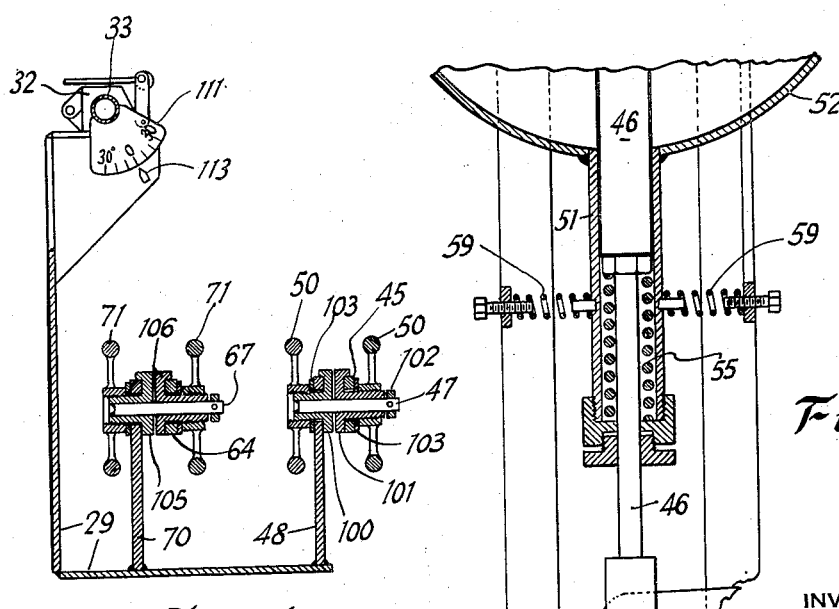
Fig.4
Fig.5
INVENTOR
Richard S. Leigh
BY
ATTORNEY Aug. 8, 1950      R. S. LEIGH      2,518,239
SPRAY NOZZLE MOUNTING AND OSCILLATING MECHANISM
Filed Jan. 3, 1945      3 Sheets-Sheet 3

INVENTOR
Richard S. Leigh
BY
ATTORNEY

Patented Aug. 8, 1950

2,518,239

UNITED STATES PATENT OFFICE 2,518,239

SPRAY NOZZLE MOUNTING AND OSCILLATING MECHANISM

Richard S. Leigh, Brooklyn, N. Y., assignor to The Babcock & Wilcox Company, Rockleigh, N. J., a corporation of New Jersey Application January 3, 1945, Serial No. 571,175

4 Claims. (Cl. 23—277)

1

The present invention relates in general to the construction and operation of spray nozzles, and more particularly, to the construction and operation of mechanisms adapted to cause oscillatory movements of spray nozzles of the type utilized in chemical recovery furnaces, such as disclosed in U. S. Patent 2,161,110.

In chemical recovery processes wherein a waste liquor, such as the "black liquor" from pulp digestors used in the kraft or sulphate process of manufacturing paper pulp, is delivered to a furnace for the recovery of inorganic chemicals and the production of useful heat by burning the combustible organic material contained in the liquor, the liquor is sprayed on the side walls of the furnace as one step in the recovery process. The amount of liquor handled in the furnace, the efficiency of chemical and heat recovery, and the reliability of the process depend to a great extent upon a uniform deposition of the liquor over a predetermined wall area of the furnace. If the deposition of liquor on the walls of the furnace were uneven, so that some portion or several portions of the wall surface would receive a materially greater amount of sprayed liquor than other portions of the wall surfaces, the result might be so-called "wet spots" where the moisture content of the sprayed liquor would not be rapidly evaporated to the degree desired. Such a wall condition might result in an undesirable moisture content of part of the char which builds up on the furnace walls and breaks off in lumps therefrom, falling onto the furnace hearth. Conversely, if a portion or portions of the wall surface should receive an insufficient amount of sprayed liquor, the moisture content might be too quickly evaporated and a portion of the inorganic chemicals sublimed by overheating, which also is undesirable.

The main object of the present invention is to provide spraying apparatus capable of depositing substantially equal layers of liquor over predetermined areas of the walls of a recovery furnace. A further and more specific object is to provide a spray nozzle mounting and operating mechanism therefore arranged to simultaneously effect a plurality of oscillating movements of the spray nozzle in different planes and to permit independent regulation of the amplitude of the oscillating movements in each plane while the mechanism is in operation. A further object is the provision of apparatus for maintaining a preselected phase relationship between the various movements of the nozzle in the different planes of operation. An additional object is to provide a means for establishing and maintaining a sub-

2 stantially uniform velocity of movement of the spray nozzle. A further object is to provide an oscillating mechanism of a rugged construction having a minimum effect on the accuracy of its adjustment due to wear in the operation thereof, and providing a simple arrangement for compensating for such wear as may occur. A further object is to provide a spray nozzle mounting capable of quick and convenient replacement of the spray nozzle.

The various features of novelty which characterize my invention are pointed out with particularity in the claims annexed to and forming a part of this specification. For a better understanding of the invention, its operating advantages and specific objects attained by its use, reference should be had to the accompanying drawings and descriptive matter in which I have illustrated and described a preferred embodiment of my invention.

Of the drawings:

Fig. 3 is a sectional side view of the apparatus taken on line 3—3 of Fig. 2;

Fig. 4 is a vertical section taken on the line 4—4 of Fig. 2;

Fig. 5 is an enlarged view, partly in section, of a portion of the apparatus shown in Fig. 1;

Fig. 6 is a view partly in section, of a part of the apparatus taken on line 6—6 of Fig. 2;

Figure 2:
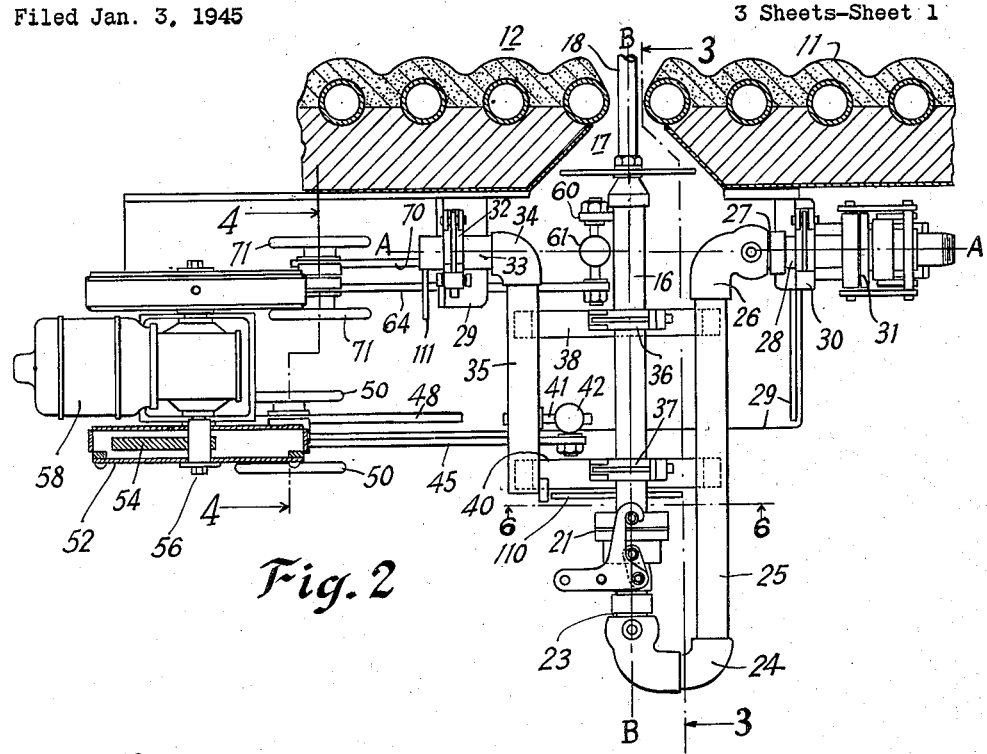
Fig. 2 is a plan view, partly in section, of the apparatus shown in Fig. 1.
Figure 1:
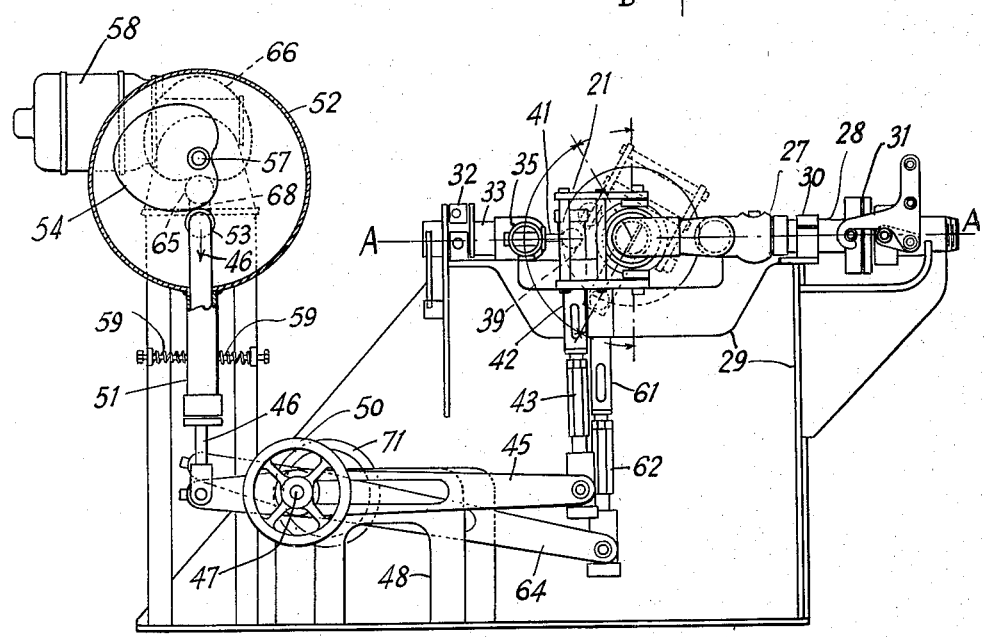
Fig. 1 is an end view, partly in section, of a spray nozzle mounting and oscillatory mechanism constructed in accordance with the present invention.
Figure 8:
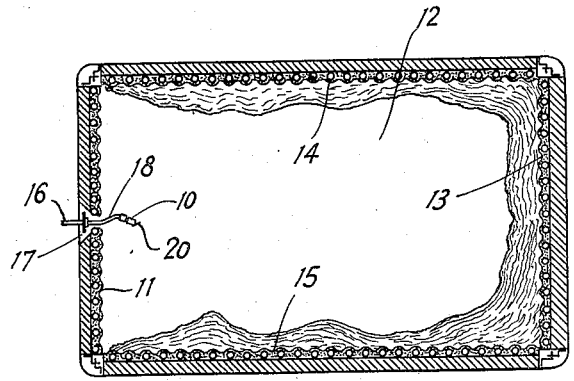
Fig. 8 is a horizontal section taken on line 8—8 of Fig. 7.
Figure 7:
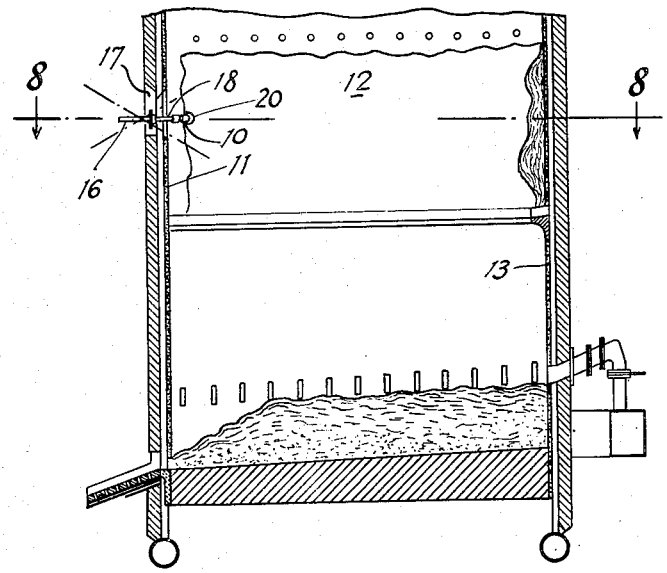
Fig. 7 is a sectional elevation of a chemical recovery furnace in which a spray nozzle is oscillated by the mechanism of the present invention.

As shown in Figs. 3, 7, and 8, a spray nozzle 10, of the general type shown in U. S. Patent 2,161,111 is positioned adjacent the front wall 11 of a chemical recovery furnace 12. The general type of furnace illustrated is disclosed in U. S. Patent 2,161,110, wherein a waste liquor is delivered to a spray nozzle which is adapted to discharge that liquor in a flat spray over an angular spray area of approximately 180°. Since, as shown particularly in Figs. 7 and 8, the spray impacts the rear wall 13 and the side walls 14 and 15 in a relatively narrow band across substantially the entire horizontal cross-section of the furnace, the nozzle is advantageously mounted so as to permit continuous predetermined oscillating movements thereof to extend the area of liquor impact on the rear and side walls of the furnace. A suitable mount for this purpose is illustrated in Figs. 1 to 3, wherein the nozzle 10 is mounted on the inner or furnace end of a bent liquor supply pipe 18 which is detachably connected at its outer end to a supply pipe 16 of larger diameter which extends outwardly in a vertical plane normal to the plane of the furnace front wall 11. The assembly of the pipe 18 with the nozzle 10 projects through a vertically elongated port 17 in the front wall 11 of the furnace. Preferably, as disclosed and claimed in a copending application of Raymond O. Gangwere, Serial No. 597,633 filed June 5, 1945, the angle of bend in pipe 18 is sufficient to position the nozzle 10 so that an extension of the axial center line of the supply pipe 16 will intersect the axial center line of the nozzle 10 at a point on the upper or liquor impact surface of the nozzle spray plate 20. Thus, with axial rotation of the supply pipe 16, the corresponding movement of the spray plate 20 will be about the same axis of rotation, and a uniform oscillatory movement transmitted to the pipe 16 will result in a uniform angular velocity in the movement of the spray plate 20. While such a uniform angular velocity of movement of the spray plate will deposit an essentially uniform coating of liquor on the side walls 14 and 15, this oscillatory movement alone would tend to deposit a concentrated layer of liquor in the center of the furnace rear wall 13 with a portion of the impacting liquor flowing down the wall in an excessively wet condition. To provide a more even distribution of deposit on the rear wall, a simultaneous tilting oscillatory movement is also transmitted to the spray nozzle 10. In the embodiment of the invention illustrated, the two oscillating movements of the spray nozzle are advantageously coordinated in the same time cycle so that the outer end of the spray plate 20 is horizontal at its upper and lower vertical positions and rotated to opposite positions when the supply pipe 16 is horizontal.

As shown in Figs. 2 and 3 the supply pipe 16 extends outwardly of the wall 11 through a joint 21 and pipe 22 to a ball bearing swing joint 23. At the joint 21, the matching flanges of pipe 16 and 22 are held in the proper contacting position by a toggle device which is so arranged as to be quickly releasable. The swing joint 23 is formed in one end of a reverse bend pipe 24 attached to a pipe 25 which is parallel to the pipe 16 and connected near the furnace wall 11 to a 90° elbow 26 equipped with a second ball bearing swing joint 27 similar to the joint 23. The joint 27 engages a pipe 28 having a horizontal axis parallel to the wall 11 and is maintained in position by a quick opening clamp 30 which is supported by the frame 29. The pipe 28 ends in a toggle clamped joint 31 which includes a pipe fitting suitable for connection to a pressure liquor supply source (not shown). On the opposite side of the pipe 16 a quick opening trunnion bearing 32, also supported by frame 29, embraces a cylindrical trunnion 33 which is attached by a 90° elbow member 34 to a cylindrical member 35. The member 35 extends away from the wall 11 and is parallel to the pipe 16. Two quick opening bearings 36 and 37 are axially spaced along the pipe 16 and are supported by the transverse angle irons 38 and 40 welded to the undersides of pipe 25 and member 35. With this construction the pipes 16 and 25 and the member 35 are maintained in a common plane and are pivotable as a unit about a horizontal axis A—A parallel to the wall 11 and passing through the axial center of the swing joint 27 and the bearing 32. Likewise, the assembly of nozzle 10 and pipes 16, 18, and 22 is rotatable about a longitudinal axis B—B in alignment with the bearings 36 and 37 and the ball bearing swing joint 23. All of the liquor supply piping in the nozzle mount described is of a uniform diameter, although the diameter of the supply pipe 18 and nozzle 10 may be changed to correspond with the size and capacity of different chemical recovery furnaces. In addition, bearings, such as 32, 36, and 37, and the joints 23 and 27 are selected to withstand the reactive thrust of the liquor discharging from the spray nozzle. Ordinarily, the liquor pressure at the nozzle will be of the order of 20 p. s. i. and all pipe connections and the swing joints 23 and 27 are capable of withstanding such liquor pressures without leakage.

The oscillating movements of the spray nozzle 10 about the axes A—A and B—B are obtained by transmitting reciprocating motions produced by a pair of motor driven cams and individual cam-followers through separate linkages connected with the nozzle mount. The reciprocating motion of each cam-follower is uniform as to the length of its stroke and any desired change in the amplitude of the nozzle oscillation about either axis is obtained by adjustment of the linkage connecting the cam-followers with the nozzle mount.

The tilting oscillation of the nozzle 10 in the vertical plane about the transverse horizontal axis A—A is obtained through the arm 41 which is secured to the member 35 and pivotally attached through a ball and socket connection 39 to a connecting rod 42. In the illustrative embodiment of the invention, the rod 42 is advantageously constructed so as to be adjustable in length and to be separable for ready disconnection in case of need. The details of this construction are shown in Fig. 3 wherein the upper portion 42a of the rod is recessed at the bottom to receive an intermediate rod-like portion 42b with the upper and intermediate portions held together by a spring held "U-pin" 44. The lower end of the intermediate portion 42b is threaded and adjustably connected to an oppositely threaded shank of a lower portion 42c by a turn buckle 43. Referring to Fig. 1, a lever arm 45 is pivotally attached by a ball and socket joint at the lower end of the rod 42 and at its opposite end to a cam-follower rod 46. The fulcrum shaft 47 for the lever 45 is movable in a horizontally elongated slot in a supporting plate 48 which is part of the frame 29, and a corresponding longitudinally elongated slot in the lever arm 45. As shown in Fig. 4, a pair of handwheels 50 with screw threaded hubs engage an associated pair of correspondingly threaded fulcrum bearing members 100 and 101 which are provided to permit adjusting the position of the shaft 47. In this construction, the members 100 and 101 are each flanged at one end, and arranged with their flanged ends abutting. The shaft 47 extends through the longitudinal axis of both bearing members and is welded to the outer end of member 100 while the member 101 is rotatably maintained on the other end of the shaft 47 by the pinned collar 102. As illustrated, the adjacent surfaces of the two flanges are co-planar and normal to the axis of shaft 47 while the opposite flange surface of the member 100 is slotted to engage the plate 48 and the opposite surface of the flange on member 101 is slotted to receive the lever arm 45. A washer 103 is interposed between the bearing end of each handwheel 50 and the correspondingly adjacent surfaces of plate 48 and lever 45. With the described construction, the fulcrum shaft 47 is fixed in a desired position by turning the handwheels 50 so that the lever 45 is held by the pressure between the member 101 and one of the adjacent washers 103. Likewise, the shaft 47 is maintained in position, relative to the plate 48 by the holding pressure between the member 100 and the washer 103. The lever 45 and the member 101 is free to oscillate as a unit about the fulcrum shaft 47. Thus, a desired change in the position of the fulcrum shaft 47 may be accomplished by releasing the holding pressure of the threaded hand wheels 50, sliding the members 100 and 101 to the newly desired location and retightening the handwheels 50. Such relocation of the fulcrum shaft 47 may be accomplished during operation of the apparatus.

The cam-follower rod 46 is extended upward to support a roller 53 mounted in the upper end thereof so as to contact the circumferential surface of a cam 54. The cam is enclosed by a cylindrical casing 52 which is provided with a lower sleeve 51 welded thereto and surrounding the rod 46. A compression spring 55 within the lower portion of the sleeve 51 encircles the rod 46 and provides an upward thrust to the rod so as to maintain positive contact between the roller 53 and the cam 54. As shown in Figs. 1 and 2, the side walls of the casing 52 have circular openings therethrough which encircle the cam shaft extension of one end of a double extended shaft 57 of a gear motor 58. The edges of the casing walls bear on this shaft and support the casing which is held in the proper lateral position by a screw 56 and its cooperating washer. Thus the casing 52 is free to rotate about shaft 57 and will oscillate with changes in the angular position of rod 46. Opposed springs 59, bearing on the outer surface of the sleeve 51 will tend to prevent movement thereof beyond the amplitude of oscillation caused by the angular changes in the position of the rod 46. Such springs will also avoid angular displacement of the rod 46 during periods of fulcrum adjustment, wherein the thrust due to the weight of the nozzle mount and the connecting linkage would be transmitted to the rod 46 and seriously effect the adjustment of the apparatus.

The motor 58 is preferably of a standard constant speed type and since the shaft 57 rotates at a generally constant speed, the cam 54, which is keyed thereto, will also rotate at an uniform angular velocity. The contour of the cam 54 is such as to provide a substantially uniformly increasing radius on one half thereof and a substantially uniformly decreasing radius on the other half, so that the linear velocity of the reciprocating rod 46 will be substantially uniform throughout both the upward and downward strokes of its movement.

While the length of stroke of the rod 46 and the frequency of reciprocation is fixed by the shape of cam 54 and the rotational speed of the motor 58, the amplitude of the oscillations transmitted by the connecting linkage to the pipe 16 may be adjusted by changing the position of the fulcrum shaft 47 in the slot of frame 48 and the corresponding slot of arm 45. As shown in Fig. 1, the cam 54 and rod 46 are in a position midway of the maximum and minimum extent of their stroke. Likewise, the pipe 16 and nozzle 10 are shown in their midposition, insofar as vertical movement is concerned, and in a substantially horizontal plane. If desired, the midposition of pipe 16 and nozzle 10 may be displaced with respect to the horizontal by lengthening or shortening rod 42 by adjusting the turnbuckle 43. Such adjustment in the length of rod 42 will also be useful in compensating for any wear as may occur in the drive mechanism and associated linkage due to extended use thereof.

The rotational oscillation of the nozzle 10 about the axis B—B is obtained through an arm 60 which is secured to the pipe 16 at a position on the furnace side of and closely adjacent the horizontally transverse axis A—A. The arm 60 is pivotally attached to a connecting rod 61 which is similar to the rod 42 previously described and its vertical axis is in a plane of axis A—A parallel to the wall 11. As with the rod 42, the rod 61 is similarly furnished with a turn buckle 62, a spring loaded pin 63 and is pivotally attached to a lever arm 64. The arm 64 oscillates about an adjustable fulcrum shaft 67 and is pivotally attached to a reciprocating cam-follower rod 68 substantially duplicating the linkage previously described in connection with the oscillation of the nozzle 10 about the axis A—A. Likewise, the fulcrum shaft 67 is movable in a horizontally elongated slot in a supporting frame 70 which is a part of the frame 29, and a corresponding slot longitudinally elongated in the lever arm 64. The adjusting mechanism for the shaft 67 is similar to the mechanism previously described in connection with fulcrum shaft 47 and includes a pair of handwheels 71, bearing members 105 and 106 with the other associated parts making up the complete assembly. The cam-follower rod 68 supports a roller 65 which is held in contact with the circumferential surface of a cam 66. The cam 66 has the same configuration as the cam 54 and is keyed to the drive shaft 57 on the opposite end of the connection thereon of the cam 54. The movements of the nozzle 10 about the two axes of oscillation, namely A—A and B—B, are advantageously synchronized so that the spray plate 20 will not be tilted relative to its longitudinal axis when the spray nozzle 10 is in its upper and lower positions and will be progressively tilted to alternate positions when the plate 20 is horizontal. This desired synchronization is obtained by keying the two cams on the shaft 57 so that cam 54 leads cam 66 by 90°. Thus, the phase relationship of the synchronized oscillatory movements of the nozzle 10 will be maintained constant regardless of changes in the amplitude of those movements. In the embodiment of the mechanism shown in the drawings, the maximum angle of oscillation of the nozzle 10 about the axis A—A is 60° and the maximum angle of oscillation about the axis B—B is 120° and the minimum angles of oscillation about the axes A—A and B—B are approximately 12° and 24° respectively, as individually accomplished by the positioning of fulcrums 47 and 67.

In the operation of the chemical recovery furnace shown the spray particles are discharged from the nozzle at a velocity and of a size sufficient to be deposited in successive layers on the furnace rear and side walls as a partially dried sticky mass. As the mass of deposited liquor particles is heated by radiation from the furnace fuel bed and ascending gases, most of the moisture remaining therein and some of the low temperature volatiles are distilled, whereby the deposited mass acquires a porous character. The mass of deposited material contains substantially all of its original organic content and each portion thereof will adhere to the wall or the surrounding mass until the effect of gravity thereon is sufficient to cause it to break off in lumps falling to and burning on the hearth of the furnace. The capacity of the recovery furnace may be varied by an increase or decrease in the amount of liquor available for treatment in the furnace and such changing conditions may be compensated by corresponding changes in the amplitude of oscillation of the nozzle 10, whereby the height of the deposited layer of liquor particles on the furnace walls will be correspondingly altered. Such adjustments in the amplitude of oscillations may be made during operation of the apparatus by relocation of the fulcrum shaft 47, and those adjustments will not effect the position of the midpoint of the oscillations of the nozzle 10 or the horizontal midposition of the liquor deposited on the furnace walls. For the convenience of the operating personnel, a pair of dials 110 and 111 are provided at the positions shown in Fig. 2, whereby the amplitude of oscillation of the nozzle 10 about each axis A—A or B—B may be indicated. As shown in Fig. 6, the dial 110 is marked in degrees and is affixed to the pipe so as to oscillate therewith in a plane normal to the axis B—B. A fixed pointer 112 is mounted upon the member 35 and the angular amplitude of movement about the axis B—B will be directly indicated on the dial. In a similar manner, as shown in Fig. 4, the dial 111 is marked in degrees and affixed to the trunnion 33 so as to oscillate therewith in a plane normal to the axis A—A. Likewise, a pointer 113, mounted upon the frame 29 will indicate the angular amplitude of movement about the axis A—A.

Since the elevated temperatures encountered in furnace operation may result in a gradual deterioration of the nozzle 10, provision has been made for the quick removal and replacement thereof. The removal of the nozzle is accomplished by detaching the upper half of the bearings 36 and 37, disconnecting the toggle joint 21 and releasing the pins 44 and 63. Thus, the pipes 16 and 18 as well as the nozzle 10 are removable as a unit, the threaded connection between pipes 16 and 18 may be detached for replacement of pipe 18 and nozzle 10, and the unit reinserted for the renewal of furnace operations. As an alternate procedure, in case of need, the complete nozzle mount may be removed by breaking joint 31, opening clamp 30 and bearing 32, and releasing pins 44 and 63.

It will be noted that my present invention provides a novel arrangement of apparatus whereby the oscillatory movements of a liquor spray nozzle as utilized in a chemical recovery furnace of the type described, may be accomplished at a substantially uniform velocity throughout the cycle of movement, and the movements synchronized to effect substantially equal deposition of liquor over predetermined areas of the furnace walls. In addition the oscillating mechanism is capable of being adjusted during operation whereby the amplitude of nozzle movement and the area of liquor deposition on the furnace walls may be changed without varying the proportionate equality of liquor deposition upon specific areas of deposit on those furnace walls. Further, the mechanism is simple and rugged in construction and is advantageously arranged to provide ready access to parts subject to deterioration whereby maintenance is simplified and repairs may be effected with a minimum of time for furnace outages.

I claim:

1. In combination with a spray nozzle arranged to discharge a substantially flat semi-circular spray of liquor particles, a frame arranged to support a liquor supply pipe extension to said nozzle including a member spaced on one side and a pipe spaced on the opposite side of said supply pipe, cross members attached to said member and pipe mounting bearings embracing said supply pipe, an elbow on an end of said member fitted into a bearing having its axis normal to and intersecting the longitudinal axis of said supply pipe, an elbow on a corresponding end of said pipe connected with a source of liquor supply and having a swing joint therein coaxial with the elbow bearing of said member defining a transverse axis, a pipe bend connecting said pipe with said supply pipe and having a swing joint therein coaxial with said supply pipe, and means for oscillating said frame and supply pipe about said axes comprising a constant speed motor, a pair of cams driven by said motor and transmitting a substantially uniform velocity of reciprocation to individual cam followers bearing on said cam surfaces, and separate linkages connecting said cam followers with said supply pipe and frame.

2. In combination, a liquid supply pipe having a spray nozzle at its discharge end arranged to discharge a substantially flat spray, a frame arranged to support said supply pipe for rotation about its longitudinal axis, a pipe parallel to said supply pipe and forming a part of said frame, an elbow on one end of said parallel pipe connected with a source of liquid supply and having a swing joint therein with its axis perpendicular to and intersecting the longitudinal axis of said supply pipe, a bearing on said frame coaxial with said swing joint and defining therewith an axis of frame rotation, a pipe bend connecting said parallel pipe with said supply pipe and having a swing joint therein coaxial with the longitudinal axis of said supply pipe, and means for oscillating said frame and supply pipe about said axes comprising a motor, a pair of cams driven by said motor and transmitting a substantially uniform velocity of reciprocation to individual cam followers bearing on said cam surfaces, and separate linkages connecting said cam followers with said supply pipe and frame.

3. In combination, a liquid supply pipe having a spray nozzle at its discharge end constructed to discharge a substantially flat spray, a frame arranged to support said supply pipe including a member spaced on one side and a pipe spaced on the opposite side of said supply pipe, cross members attached to said member and pipe mounting bearings embracing said supply pipe, an elbow on an end of said member fitted to a bearing having its axis normal to and intersecting the longitudinal axis of said supply pipe, an elbow on a corresponding end of said pipe connected with a source of liquid supply and having a swing joint therein coaxial with the elbow bearing of said member, and means for rotatably oscillating said supply pipe about its longitudinal axis and in a vertical plane about the common axis of said elbow bearing and elbow swing joint including a motor, a cam and follower for converting the rotational movement of said motor into a reciprocating motion, and separate linkages transmitting said reciprocating motion to said supply pipe for rotational oscillation about said axes.

4. The combination with vertical walls defining a chemical recovery furnace, of a liquor supply pipe normal to and projecting through the front wall of said furnace, a spray nozzle at the furnace end of said supply pipe arranged to discharge a substantially flat semi-circular spray of liquor therefrom toward and impinging on the rear and side walls of said furnace, a frame arranged to support said supply pipe for rotating oscillation of said nozzle about the longitudinal axis of said supply pipe, said frame including a pipe parallel to and spaced from one side of said liquor supply pipe with a return bend at one end thereof having a rotatable pressure connection with said supply pipe and an elbow bend at the opposite end thereof having a rotatable pressure connection with a source of liquor supply lying in a transverse horizontal axis of frame rotation, and means for simultaneously oscillating said nozzle about said axes comprising a motor, a pair of cams driven by said motor and having substantially the same configuration, one of said cams being angularly displaced 90° in advance of the other cam, a cam follower arranged to bear on the camming surfaces of each of said cams with said followers reciprocating at a substantially uniform velocity in a common plane, and linkages pivoted about a fulcrum arranged to transmit said reciprocating motion to said spray nozzle for oscillatory movements thereof about said axes.

RICHARD S. LEIGH.

REFERENCES CITED

The following references are of record in the file of this patent:

UNITED STATES PATENTS

| Number | Name | Date |
| --- | --- | --- |
| 420,141 | Baumgarth | Jan. 28, 1890 |
| 1,374,551 | Clark | Apr. 12, 1921 |
| 1,423,583 | Steps | July 25, 1922 |
| 1,439,676 | Hartman | Dec. 19, 1922 |
| 2,030,934 | Persons | Feb. 18, 1936 |
| 2,078,510 | Rabe | Apr. 27, 1937 |
| 2,138,278 | Kernin | Nov. 29, 1938 |
| 2,161,111 | Wilcoxson et al. | June 6, 1939 |
| 2,324,947 | Paradise | July 20, 1943 |

FOREIGN PATENTS

| Number | Country | Date |
| --- | --- | --- |
| 55,777 | Norway | Oct. 14, 1935 |